US011187679B1

(12) United States Patent
Safai

(10) Patent No.: US 11,187,679 B1
(45) Date of Patent: Nov. 30, 2021

(54) BEAM STEERING FOR LASER ULTRASONIC INSPECTION SYSTEMS

(71) Applicant: The Boeing Company, Chicago, IL (US)

(72) Inventor: Morteza Safai, Newcastle, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/879,450

(22) Filed: May 20, 2020

(51) Int. Cl.
*G01N 29/24* (2006.01)
*G01N 29/26* (2006.01)
*G01B 11/25* (2006.01)

(52) U.S. Cl.
CPC ......... *G01N 29/2418* (2013.01); *G01N 29/26* (2013.01); *G01B 11/25* (2013.01)

(58) Field of Classification Search
CPC ..... G01N 29/2418; G01N 29/26; G01B 11/25
See application file for complete search history.

(56) References Cited

U.S. PATENT DOCUMENTS

| 2008/0291963 | A1 | 11/2008 | Deaton et al. | |
|---|---|---|---|---|
| 2015/0085296 | A1* | 3/2015 | Ode | G01B 21/02 356/479 |
| 2017/0221778 | A1* | 8/2017 | Mehendale | G01N 29/46 |

FOREIGN PATENT DOCUMENTS

| GB | 2427282 | 12/2006 |
|---|---|---|
| WO | 2007070080 | 6/2007 |
| WO | 2019009999 | 1/2019 |

OTHER PUBLICATIONS

Paschotta, R., RP Photonics Encyclopedia, https://www.rp-photonics.com/acousto_optic_deflectors.html, accessed May 20, 2020.
Extended European Search Report for European Patent Application No. 21164197.2 dated Aug. 24, 2021.

* cited by examiner

*Primary Examiner* — Suman K Nath
(74) *Attorney, Agent, or Firm* — Kunzler Bean & Adamson

(57) ABSTRACT

Disclosed herein is a laser ultrasonic testing (UT) apparatus for inspecting a surface of an object. The laser UT apparatus comprises an excitation laser, which is selectively operable to generate an excitation laser beam. The laser UT apparatus also comprises a first acousto-optic deflector (AOD) and a second AOD. The laser UT apparatus additionally comprises a detection laser, which is selectively operable to generate a detection laser beam. The laser UT apparatus further comprises a third AOD and a fourth AOD.

20 Claims, 9 Drawing Sheets

US 11,187,679 B1

BEAM STEERING FOR LASER ULTRASONIC INSPECTION SYSTEMS

FIELD

This disclosure relates generally to non-destructive inspection of parts, and more particularly to systems and method for non-destructive inspection of parts using lasers.

BACKGROUND

Various manufacturing components, such as vehicle parts, may be utilized during a manufacturing process. Such manufacturing components may be composite structures formed from composite materials. The formation of these composite structures may inadvertently include defects, such as delaminations, inclusions, voids, disbands, and the like. Accordingly, the composite structures are scanned to assess a quality of (e.g., identify defects in) the structures.

One scanning technique that is useful for identifying defects in composite structures uses lasers. The lasers, which are directed to the surface of the structure, induce the formation of ultrasonic waves that pass through the structure and interact with features on an interior of the structure before propagating back to the surface of the structure. A detector measures the ultrasonic waves propagated to the surface of the structure and an analyzer determines if a defect is present in response to the characteristics of the ultrasonic wave propagating from the surface. Generally, a robot arm moves the lasers along a surface of the structure. Unfortunately, maintaining a consistent distance between the lasers and the surface of the structure is difficult as the robot arm moves the lasers along the surface of the structure.

SUMMARY

The subject matter of the present application provides example non-destructive inspection devices that overcome the above-discussed shortcomings of prior art techniques. The subject matter of the present application has been developed in response to the present state of the art, and in particular, in response to shortcomings of current non-destructive inspection devices.

Disclosed herein is a laser ultrasonic testing (UT) apparatus for inspecting a surface of an object. The laser UT apparatus comprises an excitation laser that is selectively operable to generate an excitation laser beam. The laser UT apparatus also comprises a first acousto-optic deflector (AOD) that is configured to receive the excitation laser beam from the excitation laser and to modulate a position of the excitation laser beam along a path parallel with a first direction. The laser UT apparatus further comprises a second AOD that is configured to receive the excitation laser beam from the first AOD and to modulate the position of the excitation laser beam along a path parallel with a second direction, which is different than the first direction. The laser UT apparatus additionally comprises a detection laser, which is selectively operable to generate a detection laser beam. The laser UT apparatus further comprises a third AOD that is configured to receive the detection laser beam from the detection laser and to modulate a position of the detection laser beam along a path parallel with the first direction. The laser UT apparatus additionally comprises a fourth AOD that is configured to receive the detection laser beam from the third AOD and to modulate the position of the detection laser beam along a path parallel with the second direction. The preceding subject matter of this paragraph characterizes example 1 of the present disclosure.

The laser UT apparatus further comprises an interferometer detector configured to detect ultrasonic energy emitted from the surface. The preceding subject matter of this paragraph characterizes example 2 of the present disclosure, wherein example 2 also includes the subject matter according to example 1, above.

The laser UT apparatus further comprises a controller that is configured to control the first AOD and the third AOD to synchronize modulation of the position of the excitation laser beam and the detection laser beam along the path parallel with the first direction. The controller is also configured to control the second AOD and the fourth AOD to synchronize modulation of the position of the excitation laser beam and the detection laser beam along the path parallel with the second direction. The preceding subject matter of this paragraph characterizes example 3 of the present disclosure, wherein example 3 also includes the subject matter according to any one of examples 1 or 2, above.

The laser UT apparatus further comprises a surface profiler configured to determine a contour of the surface, generate contour information corresponding with the contour of the surface, and communicate the contour information to the controller. The preceding subject matter of this paragraph characterizes example 4 of the present disclosure, wherein example 4 also includes the subject matter according to example 3, above.

The controller is configured to determine contour information corresponding with a contour of the surface based on a computer-aided design model of the object. The preceding subject matter of this paragraph characterizes example 5 of the present disclosure, wherein example 5 also includes the subject matter according to any one of examples 3 or 4, above.

The first direction is orthogonal to the second direction. The preceding subject matter of this paragraph characterizes example 6 of the present disclosure, wherein example 6 also includes the subject matter according to any one of examples 1-5, above.

The first AOD comprises a first piezoelectric transducer coupled to a first crystal and is configured to generate first sound waves in the first direction. The second AOD is coupled to the first AOD and further comprises a second piezoelectric transducer coupled to a second crystal and is configured to generate second sound waves in the second direction. The preceding subject matter of this paragraph characterizes example 7 of the present disclosure, wherein example 7 also includes the subject matter according to any one of example 1-6, above.

The laser UT apparatus further comprises a plurality of AODs coupled to the second AOD, each of the plurality of AODs having a piezoelectric transducer configured to generate sound waves in a direction that is orthogonal to sound waves generated by an adjacent AOD of the plurality of AODs. The preceding subject matter of this paragraph characterizes example 8 of the present disclosure, wherein example 8 also includes the subject matter according to example 7, above.

The third AOD comprises a third piezoelectric transducer coupled to a third crystal and is configured to generate third sound waves in the first direction. The fourth AOD is coupled to the third AOD and further comprises a fourth piezoelectric transducer coupled to a fourth crystal and is configured to generate fourth sound waves in the second direction. The preceding subject matter of this paragraph characterizes example 9 of the present disclosure, wherein example 9 also includes the subject matter according to any one of examples 7 or 8, above.

The laser UT apparatus further comprises a plurality of AODs coupled to the fourth AOD. Each of the plurality of AODs has a piezoelectric transducer configured to generate sound waves in a direction that is orthogonal to sound waves generated by an adjacent AOD of the plurality of AODs. The preceding subject matter of this paragraph characterizes example 10 of the present disclosure, wherein example 10 also includes the subject matter according to example 9, above.

Further disclosed herein is a system for a non-destructively inspecting an object. The system comprises a robotic arm. The system also comprises a controller configured to control movement of a tool center point (TCP) of the robotic arm. The system further comprises a laser ultrasonic testing (UT) apparatus coupled to the TCP. The laser UT apparatus comprises a first pair of acousto-optic deflectors (AODs). Each AOD of the first pair of AODs is configured to modulate an excitation laser beam generated by an excitation laser in one of an x-dimension or a y-dimension. The x-dimension is orthogonal to the y-dimension. The laser UT apparatus also comprises a second pair of AODs that are each configured to modulate a detection laser beam generated by a detection laser in one of the x-dimension or the y-dimension. The preceding subject matter of this paragraph characterizes example 11 of the present disclosure.

The system further comprises an interferometer detector configured to detect ultrasonic energy emitted from a surface of the object. The preceding subject matter of this paragraph characterizes example 12 of the present disclosure, wherein example 12 also includes the subject matter according to example 11, above.

The controller is further configured to synchronize excitation of the first pair of AODs with excitation of the second pair of AODs. The preceding subject matter of this paragraph characterizes example 13 of the present disclosure, wherein example 13 also includes the subject matter according to any one of examples 11 or 12, above.

The system further comprises a surface profiler configured to determine a contour of a surface, generate contour information corresponding with the contour of the surface, and communicate the contour information to the controller. The preceding subject matter of this paragraph characterizes example 14 of the present disclosure, wherein example 14 also includes the subject matter according to any one of examples 11-13 above.

The controller is configured to determine contour information corresponding with a contour of a surface based on a computer-aided design model of the object. The preceding subject matter of this paragraph characterizes example 15 of the present disclosure, wherein example 15 also includes the subject matter according to any one of example 11-14, above.

Additionally disclosed herein is a method of non-destructively inspecting an object. The method comprises positioning a laser ultrasonic testing (UT) apparatus adjacent a surface of the object. The laser UT apparatus comprises a first pair of acousto-optic deflectors (AODs) that are each configured to modulate deflection of an excitation laser beam in one of an x-dimension or a y-dimension. The x-dimension is orthogonal to the y-dimension. The laser UT apparatus also comprises a second pair of AODs that are each configured to modulate deflection of a detection laser beam in one of the x-dimension or the y-dimension. The method also comprises matching the deflection of the excitation laser beam with the deflection of the detection laser beam by synchronizing excitation of the first pair of AODs with excitation of the second pair of AODs. The method further comprises scanning the object for defects. The method additionally comprises traversing, with the laser UT apparatus at a predetermined distance from the surface, the surface of the object. The preceding subject matter of this paragraph characterizes example 16 of the present disclosure.

The method further comprises detecting, at an interferometer detector, ultrasonic energy emitted from the object. The preceding subject matter of this paragraph characterizes example 17 of the present disclosure, wherein example 17 also includes the subject matter according to example 16, above.

The method further comprises analyzing the detected ultrasonic energy to identify existence of defects in the object. The preceding subject matter of this paragraph characterizes example 18 of the present disclosure, wherein example 18 also includes the subject matter according to example 17, above.

Scanning the object for defects further comprises scanning the object according to contour information of the surface of the object. The preceding subject matter of this paragraph characterizes example 19 of the present disclosure, wherein example 19 also includes the subject matter according to any one of examples 16-18, above.

The method further comprises maintaining, via a robotic arm, a predetermined distance between the laser UT apparatus and the object based on a contour of the surface. The preceding subject matter of this paragraph characterizes example 20 of the present disclosure, wherein example 20 also includes the subject matter according to any one of examples 16-19, above.

The described features, structures, advantages, and/or characteristics of the subject matter of the present disclosure may be combined in any suitable manner in one or more examples. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example. In other instances, additional features and advantages may be recognized in certain examples that may not be present in all examples. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
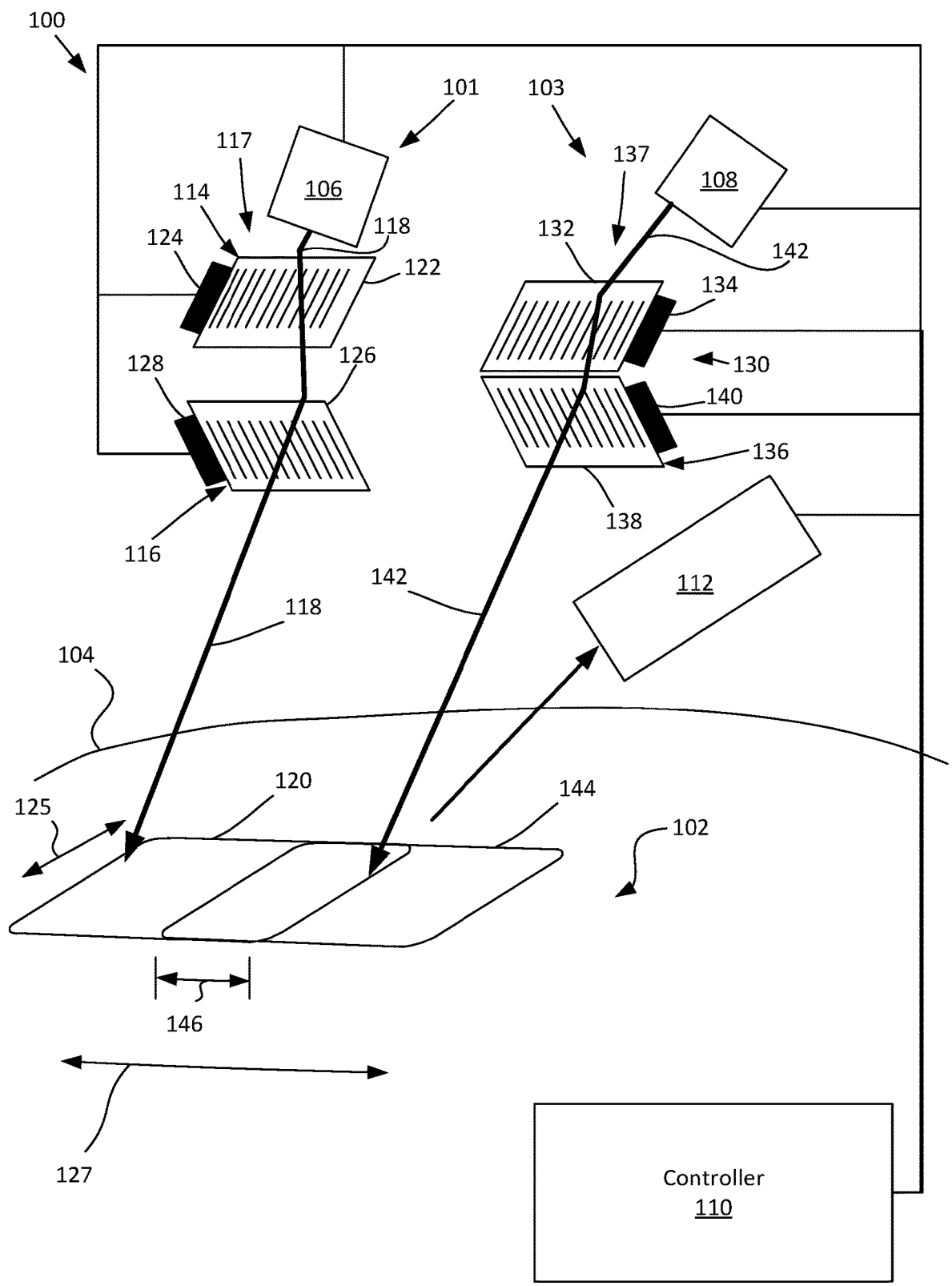
FIG. 1 is a schematic block diagram illustrating one example of a laser ultrasonic testing apparatus, according to examples of the subject disclosure.
Figure 2:
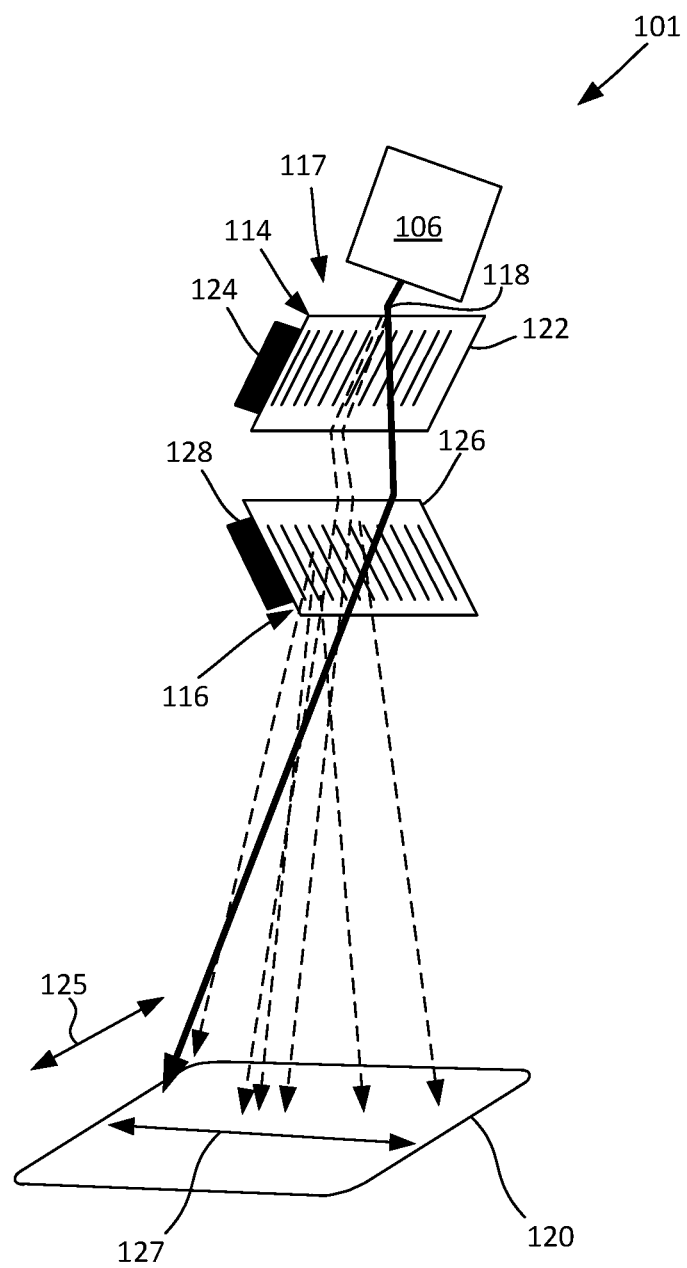
FIG. 2 is a schematic block diagram illustrating one example of an excitation laser assembly of the laser ultrasonic testing apparatus of FIG. 1, according to examples of the subject disclosure.
Figure 3:
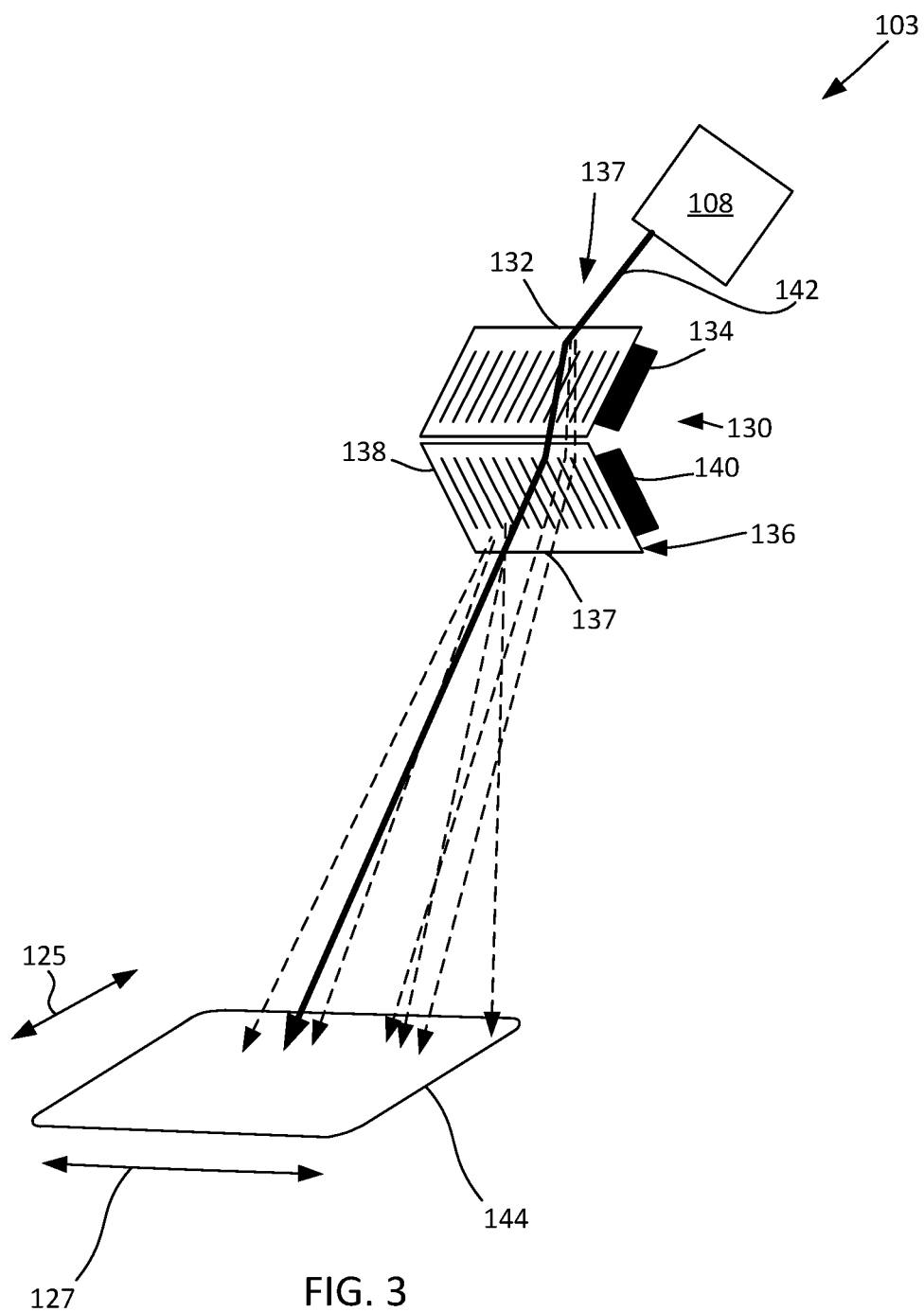
FIG. 3 is a schematic block diagram illustrating one example of a detection laser assembly of the laser ultrasonic testing apparatus of FIG. 1, according to examples of the subject disclosure.

Referring to FIG. 1, shown is a laser ultrasonic testing (UT) apparatus 100 for non-destructive testing a surface 102 of an object 104, according to examples of the subject disclosure. The laser UT apparatus 100, in certain examples, includes an excitation laser assembly 101, a detection laser assembly 103, a controller 110, and an interferometer detector 112. For clarity, FIG. 1 illustrates a simplified view of the laser UT apparatus 100 that includes the excitation laser 106, the detection laser 108, the controller 110, and the interferometer detector 112 without showing diffracted laser beams. FIG. 2 and FIG. 3 depict, respectively, individual views of the excitation laser assembly 101 and the detection laser assembly 103, each showing diffracted beams to depict how the laser UT apparatus 100 raster scans the excitation laser 106 and the detection laser 108 across the surface 102 of the object 104.

The object 104, in certain examples, is any suitable structure such as a portion of an aircraft (e.g., wing, fuselage, etc.), or another manufactured structure. The object 104 has a defect if there is a deformation on the surface of the object 104, such as a deformation resulting from air trapped under the surface 102 of the object 104, or a defect that is internal to the object 104. In some situations, the air trapped under the surface 102 of the object 104 results from disbonded layers/materials. The laser UT apparatus 100 is configured to detect the defect in the object 104.

In certain examples, the excitation laser assembly 101 includes an excitation laser 106, which is configured to generate ultrasound energy in the form of excitation laser beam 118. Lasers suitable for use as the excitation laser 106 include, but are not limited to, gas lasers, chemical lasers, dye lasers, solid-state lasers, semiconductor lasers, etc. The excitation laser beam 118 of the excitation laser 106 generates ultrasonic energy waves by the sudden thermal expansion of an area of the surface 102. The sudden thermal expansion, due to the heating of a small area of the surface 102, creates the ultrasound. A frequency of the generated ultrasound, in certain examples, is determined by the pulsing frequency of the excitation laser 106. In some examples, a power level of the excitation laser 106 is sufficient to cause evaporation, or ablation, of some of the surface 102, and ultrasonic energy is generated by the recoil effect of the evaporated material.

A portion of the ultrasonic energy waves immediately reflect off of the surface 102, while another portion of the ultrasonic energy waves propagate into the object 104. Moreover, a portion of these propagated waves reflect off of, for example, layer boundaries within the object 104 towards a position of the detection laser 108. These ultrasonic energy waves, in certain examples, deform or displace the surface 102 as they are emitted from the surface 102, causing deflections of a detection laser beam 142, generated by a detection laser 108 of the detection laser assembly 103, which are detected by the interferometer detector 112. Accordingly, the interferometer detector 112 is configured to detect ultrasonic energy and communicates information related to the detected ultrasonic energy with the controller 110.

The interferometer detector 112, in certain examples, is configured to detect multiple laser-produced interferometry points. Ultrasonic information created by the excitation laser 106 deflects reflected beams from the detection laser 108 which are detected by the interferometer detector 112. The ultrasonic information is communicated with the controller 110 and analyzed to identify defects in the object 104.

In certain examples, a first acousto-optic deflector ("AOD," or "AODs" when referring to multiple acousto-optic deflectors) 114 and a second AOD 116 of the excitation laser assembly 101 are optically coupled to the excitation laser 106 and configured to direct an excitation laser beam 118 generated by the excitation laser 106 in a scanning motion across the surface 102 of the object 104. The first AOD 114 and the second AOD 116 collectively are referred to as the first pair of AODs 117. As depicted in FIGS. 1 and 2, the first AOD 114 and the second AOD 116 cause the excitation laser beam 118 to raster scan (i.e., scan line by line) across an excitation area 120 of the object 104. Each of the first AOD 114 and the second AOD 116, in certain examples, is configured to deflect the excitation laser beam 118 along a single axis. For ease of description, in a two-dimensional space defined by the surface 102 of the object 104, a first axis is an x-dimension, also referred to herein as a first direction 125, and a second axis is the y-dimension, also referred to herein as the second direction 127. In certain examples, the x-dimension, or first direction 125, is orthogonal to the y-dimension, or second direction 127.

The first AOD 114 and the second AOD 116 deflect the excitation laser beam 118 in accordance with Bragg diffraction principles. In certain examples, the first AOD 114 includes a first crystal 122 and a first piezoelectric transducer 124 coupled to the first crystal 122. When the first piezoelectric transducer 124 generates sound waves, the excitation laser beam 118 passing through the first crystal 122 is deflected. The angle of deflection is related to the frequency of the sound waves. The first crystal 122 is a specialized birefringent material that has a variable refractive index. Increasing the sound wave increases the deflection of the excitation beam away, along a path parallel to the first direction 125, from a central axis position of the excitation laser beam 118.

Likewise, the second AOD 116 includes a second crystal 126 and a second piezoelectric transducer 128. The second AOD 116 is configured to deflect the excitation laser beam 118 along a path parallel to the second direction 127 that is substantially orthogonal to the first direction 125. As used herein, the term "substantially" refers to a range of values that are ±10% of the referenced value. For example, a "substantially orthogonal" orientation includes axes that form an angle of between about 80 degrees and 100 degrees. Working together, the first AOD 114 and the second AOD 116 are controllable by the controller 110 to direct the excitation laser beam 118 to raster scan across the excitation area 120.

In certain examples, the detection laser assembly 103 of the laser UT apparatus 100 includes a third AOD 130 (including a third crystal 132 and a third piezoelectric transducer 134), and a fourth AOD 136 (including a fourth crystal 138 and a fourth piezoelectric transducer 140). The third AOD 130 and the fourth AOD 136, in certain examples, are referred to as the second pair of AODs 137. The third AOD 130 and the fourth AOD 136 are optically coupled with the detection laser 108. In other words, like the first AOD 114 and the second AOD 116 with the excitation laser 106, the third AOD 130 and the fourth AOD 136 are in a receiving relationship of a detection laser beam 142 of the detection laser 108. As described above, as the detection laser beam 142 passes through the third AOD 130 and the fourth AOD 136, the respective piezoelectric transducers 134, 140 cause a deflection of the detection laser beam 142 along a path parallel to either the first direction 125 or the second direction 127 to effectuate the raster scan of a detection area 144.

In certain examples, as will be described in greater detail below, the laser UT apparatus 100 is moved along the surface 102 of the object 104. A distance 146 is maintained between the excitation laser 106 and the detection laser 108, and subsequently the excitation area 120 and the detection area 144. In some examples, as depicted in FIG. 1, the detection area 144 partially intersects with the excitation area 120. The distance 146 of the offset, beneficially, is minimized because beam deflection or beam steering is accomplished without mechanical intervention. This allows for miniaturization of the laser UT apparatus 100.

In certain examples, the laser pulses, and beam deflections from a central axis (i.e., default beam position), of both the excitation laser 106 and the detection laser 108 are synchronized by synchronizing energy levels of the first AOD 114 and second AOD 116 with those of the third AOD 130 and fourth AOD 136. For example, the controller 110 is configured to control a voltage applied to the AODs, both individually and/or collectively, to synchronize the pulse and position of the excitation beam and the detection laser beam 142. This beneficially allows for the detection laser beam 142 to be optimally positioned to detect ultrasonic energy generated by the excitation laser 106. The controller 110 is configured to control each AOD 114, 116, 130, 136 from a single power source using an algorithm based on crystal orientation. As will be discussed in greater detail below, the algorithm implements a time delay between the modulation of the excitation laser 106 and the detection laser 108 to allow for the generation and propagation of ultrasonic waves. The AODs 114, 116, 130, 136 can also function as an optical shutter (e.g., beam chopper) to modulate the pulse time of the excitation laser beam 118 and the detection laser beam 142.

Figure 4:
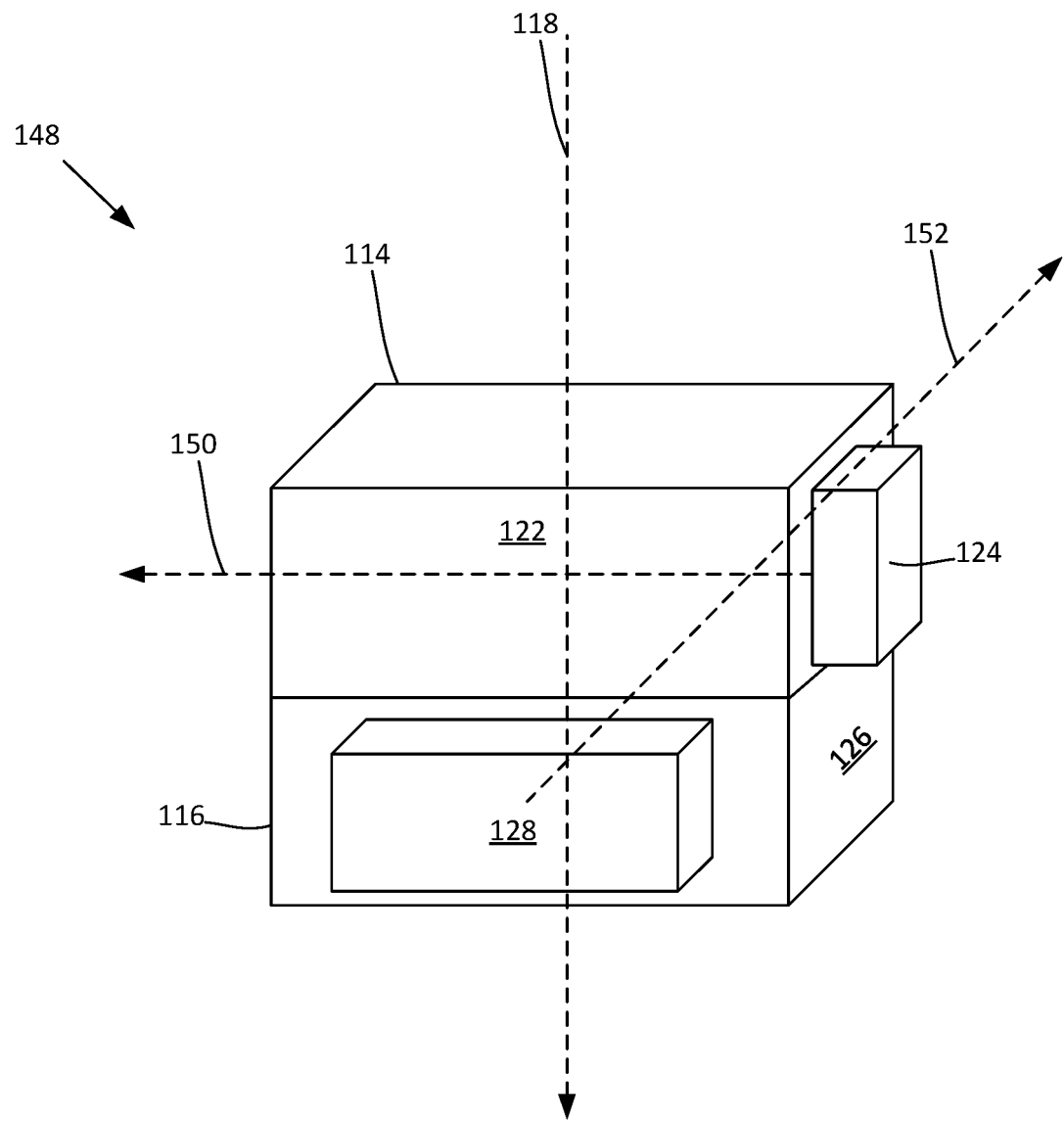
FIG. 4 is a schematic block diagram illustrating one example of a pair of acousto-optic deflectors, according to examples of the subject disclosure.

Referring now to FIG. 4, shown is a perspective view diagram of the first pair of AODs 148, according to examples of the subject disclosure. Although described here as a depiction of the first AOD 114 and the second AOD 116 of the excitation laser assembly 101, the description applies generally to the third AOD 130 and the fourth AOD 136 of the detection laser assembly 103. In certain examples, the first AOD 114 is coupled to the second AOD 116. In some examples, the first AOD 114 and the second AOD 116 are physically coupled, while in other examples the first AOD 114 and the second AOD 116 are optically coupled. The phrase "optically coupled" refers to being disposed in an orientation or relationship such that excitation laser beam 118 of the excitation laser 106 passes through both the first AOD 114 and the second AOD 116. The first piezoelectric transducer 124 is disposed on a face of the first crystal 122 such that sound waves generated by the first piezoelectric transducer 124 travel in a direction that is transverse to a direction of travel of the excitation laser beam 118, as depicted by arrow 150.

In certain examples, the second piezoelectric transducer 128 is disposed on a face of the second crystal 126 such that sound waves generated by the second piezoelectric transducer 128 travel in a direction, as indicated by arrow 152, which is transverse to the excitation laser beam 118. In certain examples, the arrows 150, 152 correspond to the first direction 125 and the second direction 127, respectively, of FIGS. 1-3. In some examples, the direction identified by arrow 150 is substantially orthogonal to the direction identified by arrow 152.

Figure 5:
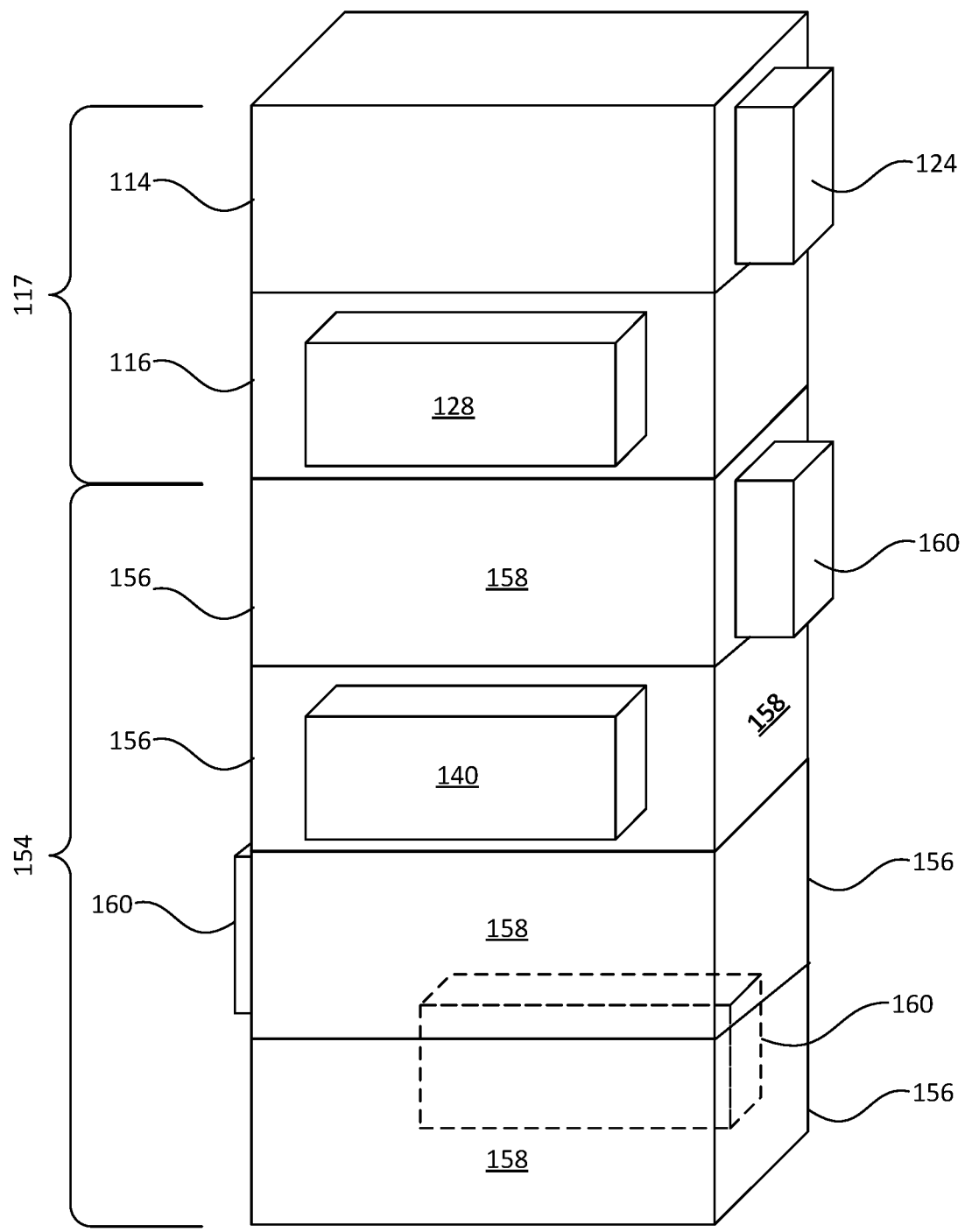
FIG. 5 is a schematic block diagram illustrating one example of a plurality of acousto-optic deflectors, according to examples of the subject disclosure.

FIG. 5 is a perspective view of a plurality of AODs, according to examples of the subject disclosure. In certain examples, one or more additional AODs 156 are coupled to the first AOD 114 and the second AOD 116 (e.g., the first pair of AODs 117). Each of the additional AODs 156 are optically coupled with the first AOD 114 and the second AOD 116 such that the excitation laser beam 118 passes through each of the additional AODs 156. A grouping of additional AODs 156 are referred to as a plurality of AODs 154. As with FIG. 4, the additional AODs 156, in some examples, are coupled in a similar manner to the third AOD 130 and fourth AOD 136 of the detection laser 108.

Each of the additional AODs 156 includes a crystal 158 and a piezoelectric transducer 160. The piezoelectric transducer 160 of each additional AOD 156, in certain examples, is disposed such that sound waves are generated in a direction that is orthogonal to an adjacent AOD of the additional AODs 156. In other words, adjacent piezoelectric transducers 160 are positioned on alternating faces of the crystals 158. Although the crystals depicted in FIGS. 1-5 are quadrilaterals, it is contemplated that the AODs have a convenient amount of faces (i.e., triangle, pentagon, hexagon, etc.).

Figure 6:
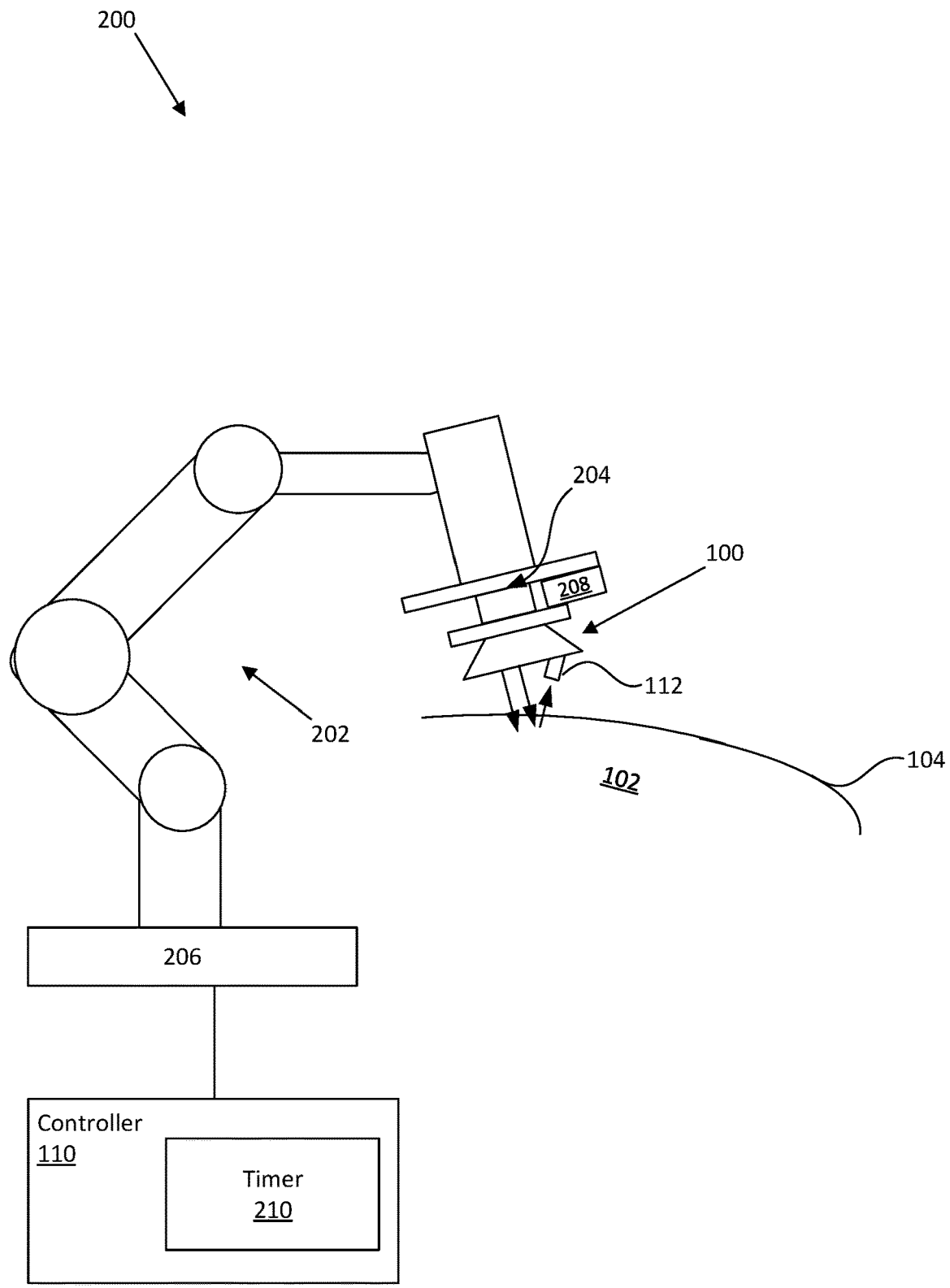
FIG. 6 is schematic block diagram illustrating one example of a system for non-destructive testing, according to examples of the subject disclosure.

Referring now to FIG. 6, shown is a schematic block diagram illustrating one example of a system 200 for non-destructive inspection (NDI) of a manufacturing component (e.g., also referred to as the object 104), according to examples of the subject disclosure. In certain examples, the system 200 is used to inspect a variety of structures including composite structures of a wide range of sizes and shapes, such as composite aircraft wings, spars, and fuselage barrels.

The system 200, in certain examples, includes a robotic arm 202. The robotic arm 202 is a jointed-arm robot that is configured to provide movement and positioning of a tool center point (TCP) 204. The TCP 204, in certain examples, is a mathematical point (positioned on an end of the robotic arm 202) that the robotic arm 202 moves through space with reference to the robotic base 206. The TCP 204, in certain examples, is located at an end of the robotic arm 202, and is configured to couple to a tool, such as a laser UT apparatus 100. For example, the end of the robotic arm 202 is a plate to which the laser UT apparatus 100, or the end effector, is attached. The TCP 204, in certain examples, is a point positioned a predetermined distance from the end of the robotic arm that corresponds with an ideal distance from the laser UT apparatus 100 for scanning the surface 102 of the object 104. The controller 110 is configured to control movement and positioning of the TCP 204.

The controller 110, in certain examples, is implemented using software, hardware, firmware, or a combination thereof. When software is used, the operations performed by the controller 110 are implemented using, for example, program code configured to run on a processor unit. When firmware is used, the operations are implemented using, for example, program code and data stored in persistent memory to run on a processor unit. When hardware is used, the hardware includes one or more circuits that operate to perform the operation of moving the TCP 204. The hardware, in certain examples, takes the form of a circuit system, an integrated circuit, an application specific integrated circuit (ASIC), a programmable logic device, etc.

The controller 110, in certain examples, is configured to control the movement of the robotic arm 202 which is capable of movement with up to six degrees of freedom or more. The robotic arm 202 is, in certain examples, is configured to couple with the end effector (e.g., the laser UT apparatus 100). The end effector, in one example, is integrated as part of the robotic arm 202 or alternatively, is removably coupled to the TCP 204. Inspection of the object 104, in certain examples, uses the laser UT apparatus 100, as described above with reference to FIGS. 1-5. The structure of the object 104 is scanned by the laser UT apparatus 100 to ensure the object 104 is free of defects.

The object 104, in certain examples, has portions with curvatures of varying radii and varying angles. For effective scanning, the laser UT apparatus 100 is positioned adjacent the object 104. In certain examples, the laser UT apparatus 100 is maintained at a particular distance and angle or orientation relative to a particular position of the object 104. To accomplish this, the controller 110 is configured to communicate with a surface profiler 208. In certain examples, the surface profiler 208 is a laser profiler configured to determine a contour or curvature of the surface 102 of the object 104. In some examples, the surface profiler 208 is configured to analyze and determine the contour information of the object 104 from a computer-aided design model of the object 104. The surface profiler 208, in certain examples, communicates the contour information with the controller 110. Subsequent to determining the curvature, the controller 110 is configured to maintain an appropriate distance between the laser UT apparatus 100 and the surface 102 of the object 104.

In certain examples, the controller 110 includes a timer 210. The timer 210 is configured to synchronize, but delay the modulation of the detection laser 108 via the third AOD 130 and the fourth AOD 136. The controller 110, in certain examples, includes a single piezoelectric driver that provides a driving signal to the piezoelectric transducers 124, 128, 134, 140. To accommodate a time required to generate ultrasonic waves, and allow the waves to propagate into the object 104, and potentially reflect back to the surface 102 for detection, the timer 210 introduces a delay in the driving signal. The delay, although miniscule, allows the detection laser 108 to be modulated to the appropriate position to detect the ultrasonic waves. This delay varies based on the curvature of the surface 102. For example, a substantially planar surface requires a smaller delay than a concave or convex surface. The timer 210 is configured to update the delay based on the curvature information, in certain examples, derived by the surface profiler 208.

Figure 7:
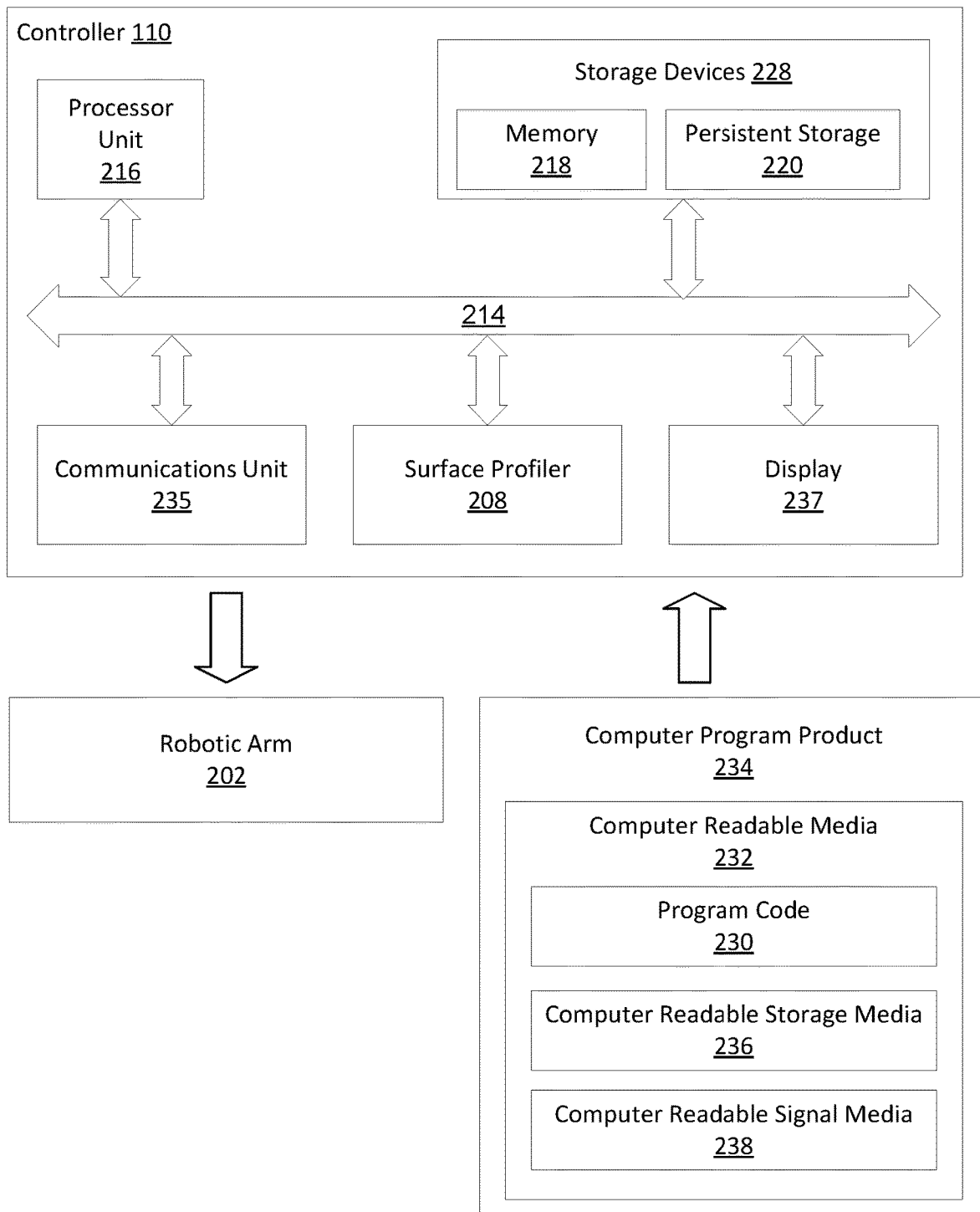
FIG. 7 is a schematic block diagram illustrating one example of a controller, according to examples of the subject disclosure.

FIG. 7 is a schematic block diagram illustrating a controller 110, according to examples of the subject disclosure. The controller 110 is an example of a computing device, which, in some examples, is used to implement one or more components of examples of the disclosure, and in which computer usable program code or instructions implementing the processes can be located for the illustrative examples. In this illustrative example, the controller includes a communications fabric 214, which provides communications between a processor unit 216, memory 218, surface profiler 208, persistent storage 220, a communications unit 235, and a display 237.

The surface profiler 208, in certain examples, is disposed on the robotic arm 202 and is configured to scan the surface of the object 104 to determine a curvature of the surface 102 of the object 104. The surface profiler 208 is also configured to measure a distance between the TCP 204 and the object 104 and communicate that distance with the controller 110. In turn, the controller 110 is configured to move the TCP 204 in response to the determined distance.

The processor unit 216 serves to execute instructions for software that are loaded into memory 218 in some examples. In one example, the processor unit 216 is a set of one or more processors or can be a multi-processor core, depending on the particular implementation. Further, the processor unit 216 is implemented using one or more heterogeneous processor systems, in which a main processor is present with secondary processors on a single chip, according to some examples. As another illustrative example, the processor unit 216 is a symmetric multi-processor system containing multiple processors of the same type.

Memory 218 and persistent storage 220 are examples of storage devices 228. A storage device is any piece of hardware that is capable of storing information, such as, for example, without limitation, data, program code in functional form, and/or other suitable information either on a temporary basis and/or a permanent basis. Memory 218, in these examples, is a random-access memory, or any other suitable volatile or non-volatile storage device. Persistent storage 220 takes various forms, depending on the particular implementation. In one example, persistent storage 220 contains one or more components or devices. In an example, persistent storage 220 is a hard drive, a flash memory, a rewritable optical disk, a rewritable magnetic tape, or some combination of the above. The media used by persistent storage 220 is removable in some examples. For example, a removable hard drive is used for persistent storage 220 in various implementations.

The communications unit 235, in these examples, provides for communication with other data processing systems or devices. In these examples, the communications unit 235 is a network interface card. The communications unit 235 provides communications through the use of either, or both, physical and wireless communications links. In some examples, the communications unit 235 also provides a connection for user input through a keyboard, a mouse, and/or some other suitable input device. Further, the input/output unit sends output to a printer or receive input from any other peripheral device in various examples. The display 237 provides a mechanism to display information to a user.

In some examples, instructions for the operating system, applications, and/or programs are located in the storage devices 228, which are in communication with the processor unit 216 through the communications fabric 214. In these illustrative examples, the instructions are in a functional form on persistent storage 220. These instructions are loaded into memory 218 for execution by the processor unit 216 in some examples. In certain examples, the processes of the different examples are performed by the processor unit 216 using computer implemented instructions, which is located in a memory, such as the memory 218.

These instructions are referred to as program code, computer usable program code, or computer readable program code that can be read and executed by a processor in the processor unit 216. The program code, in the different examples, is embodied on different physical or computer readable storage media, such as the memory 218 or the persistent storage 220.

Program code 230 is located in a functional form on computer readable media 232 that is selectively removable and can be loaded onto or transferred to the controller 110 for execution by the processor unit 216. In some examples, the program code also contains the computer-aided design of the object 104. The program code 230 and computer readable storage media 236 form computer program product 234. In one example, the computer readable media 232 is a computer readable storage media 236 or a computer readable signal media 238. The computer readable storage media 236 includes, in one example, an optical or magnetic disc that is inserted or placed into a drive or other device that is part of the persistent storage 220 for transfer onto a storage device, such as a hard drive, that is part of the persistent storage 220. In other examples, the computer readable storage media 236 also takes the form of a persistent storage, such as a hard drive, a thumb drive, or a flash memory that is connected to the controller 110. In some instances, the computer readable storage media 236 is not removable from the controller 110.

Alternatively, the program code 230 is transferred to the controller 110 using computer readable signal media 238. Computer readable signal media 238 is, as one example, a propagated data signal containing program code 230. For example, the computer readable signal media 238 is an electromagnetic signal, an optical signal, and/or any other suitable type of signal in one example. These signals are transmitted over communications links, such as wireless communication links, an optical fiber cable, a coaxial cable, a wire, and/or any other suitable type of communications link. In other words, the communications link and/or the connection is physical or wireless in the illustrative examples. The computer readable media also takes the form of non-tangible media, such as communications links or wireless transmissions containing the program code, in some examples.

In some illustrative examples, the program code 230 is downloaded over a network to the persistent storage 220 from another device or data processing system through the computer readable signal media 238 for use within the controller 110. In one instance, program code stored in a computer readable storage media in a server data processing system is downloaded over a network from a server to the controller 110. According to various examples, the system providing the program code 230 is a server computer, a client computer, or some other device capable of storing and transmitting program code 230.

The different components illustrated for the controller 110 are not meant to provide physical or architectural limitations to the manner in which different examples can be implemented. The different illustrative examples can be implemented in a controller including components in addition to and/or in place of those illustrated for the controller 110. Other components shown in FIG. 7 can be varied from the illustrative examples shown. The different examples can be implemented using any hardware device or system capable of executing program code. For example, a storage device in the controller 110 is any hardware apparatus that can store data. The memory 218, persistent storage 220, and the computer readable media 232 are examples of storage devices in a tangible form.

In another example, a bus system is used to implement communications fabric 214 and can be comprised of one or more buses, such as a system bus or an input/output bus. Of course, in some examples, the bus system is implemented using any suitable type of architecture that provides for a transfer of data between different components or devices attached to the bus system. In addition examples, a communications unit includes one or more devices used to transmit and receive data, such as a modem or a network adapter. Further, a memory is, for example, the memory 218 or a cache such as found in an interface and memory controller hub that can be present in the communications fabric 214.

Computer program code for carrying out operations for aspects of the subject disclosure can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
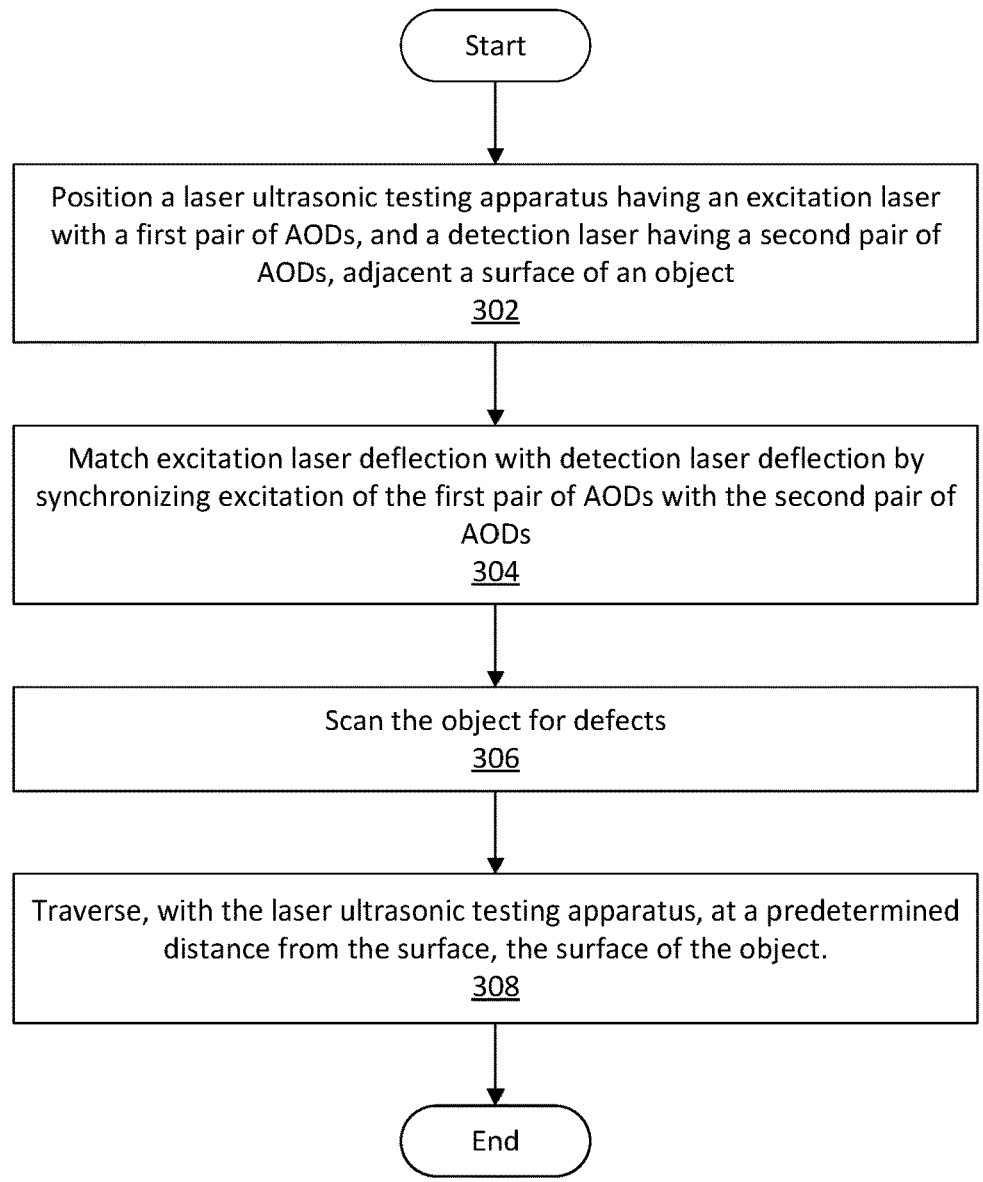
FIG. 8 is a flowchart diagram illustrating a method of non-destructively inspecting an object, according to examples of the subject disclosure.

FIG. 8 is a flowchart diagram illustrating a method 300 of non-destructively inspecting a part, according to examples of the subject disclosure. The method includes, at block 302, positioning the laser UT apparatus 100 adjacent the surface 102 of the object 104. In certain examples, the laser UT apparatus 100 is configured as described above with reference to FIGS. 1-5. Stated differently, the laser UT apparatus 100 includes the first AOD 114, the second AOD 116, the third AOD 130, and the fourth AOD 136. At block 304, the method 300 includes matching deflection of the excitation laser beam 118 of the excitation laser 106 with deflection of the detection laser beam 142 of the detection laser 108 by synchronizing excitation of the first AOD 114 and second AOD 116 with the third AOD 130 and the fourth AOD 136. In certain examples, the controller 110 excites, or energizes (i.e., applies a voltage), the AODs 114, 116, 130, 136 with the same excitation signal so that deflection of the excitation laser beam 118 matches deflection of the detection laser beam 142.

At block 306, the method includes scanning the object 104 for defects. In certain examples, scanning the object 104 for defects includes the controller 110 commanding the excitation laser 106 to generate ultrasonic waves and commanding the detection laser 108 to detect the ultrasonic waves. At block 308 the method 300 includes traversing, with the laser UT apparatus 100, the surface 102 of the object 104. In certain examples, traversing the surface 102 of the object 104 includes the controller 110 commanding the robotic arm 202 to move the laser UT apparatus 100 across the surface 102 of the object 104.

Figure 9:
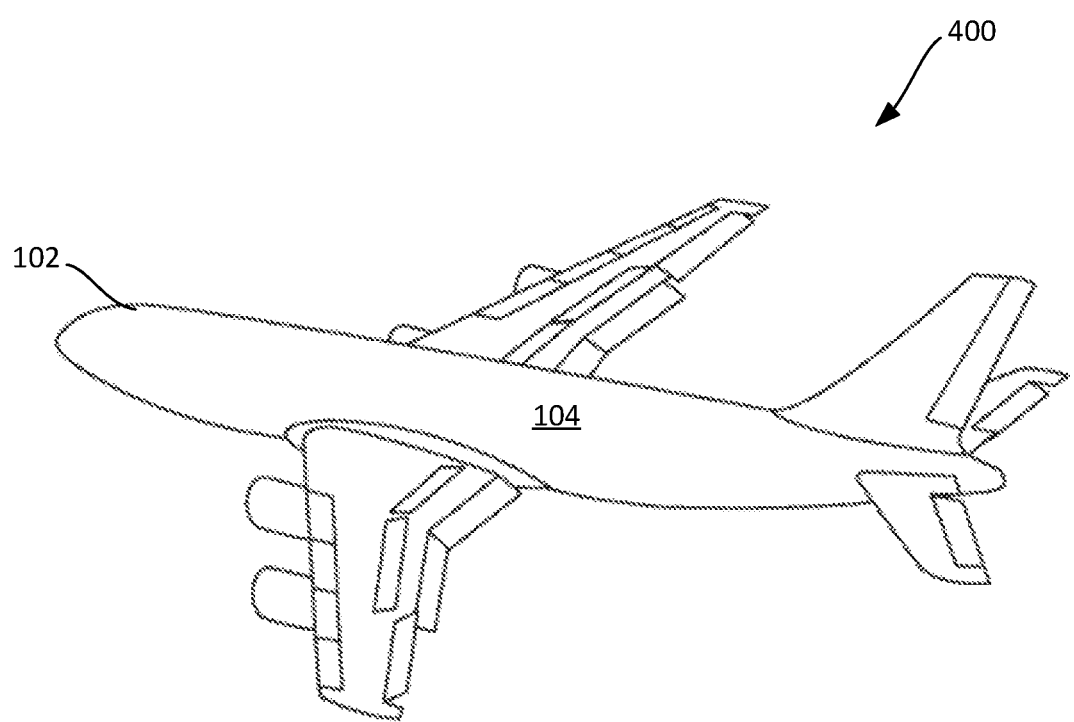
FIG. 9 is a perspective view diagram illustrating one example of a structure, according to examples of the subject disclosure.

Referring now to FIG. 9, shown here is one example of a structure 400 on which non-destructive testing is performed, according to examples of the subject disclosure. The structure 400, in certain examples, is an airplane or any suitable manufactured device such as vehicles, aircraft, turbines, engines, and equipment operable in space-like environments (e.g., satellites, rockets, missiles, space stations, etc.). The object 104, in certain examples, is a component of the structure 400 such as a wing, fuselage, wing spar, etc. The structure is tested using the laser UT apparatus 100. In some examples, the laser UT apparatus 100 enables ultrasonic testing on surfaces 102 of the structure 400.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

The present subject matter may be embodied in other specific forms without departing from its essential characteristics. The described examples are to be considered in all respects only as illustrative and not restrictive. All changes which come within the meaning and range of equivalency of the claims are to be embraced within their scope.

What is claimed is:

1. A laser ultrasonic testing (UT) apparatus for inspecting a surface of an object, the laser UT apparatus comprising:
an excitation laser, selectively operable to generate an excitation laser beam;
a first acousto-optic deflector (AOD) configured to receive the excitation laser beam from the excitation laser and to modulate a position of the excitation laser beam along a path parallel with a first direction;
a second AOD configured to receive the excitation laser beam from the first AOD and to modulate the position of the excitation laser beam along a path parallel with a second direction, which is different than the first direction;
a detection laser, selectively operable to generate a detection laser beam;
a third AOD configured to receive the detection laser beam from the detection laser and to modulate a position of the detection laser beam along a path parallel with the first direction;
a fourth AOD configured to receive the detection laser beam from the third AOD and to modulate the position of the detection laser beam along a path parallel with the second direction; and
a controller configured to:
control the first AOD and the third AOD to synchronize modulation of the position of the excitation laser beam and the detection laser beam along the path parallel with the first direction; and
control the second AOD and the fourth AOD to synchronize modulation of the position of the excitation laser beam and the detection laser beam along the path parallel with the second direction.

2. The laser UT apparatus of claim 1, further comprising an interferometer detector configured to detect ultrasonic energy emitted from the surface.

3. The laser UT apparatus of claim 1, further comprising a surface profiler configured to determine a contour of the surface, generate contour information corresponding with the contour of the surface, and communicate the contour information to the controller.

4. The laser UT apparatus of claim 1, wherein the controller is configured to determine contour information corresponding with a contour of the surface based on a computer-aided design model of the object.

5. The laser UT apparatus of claim 1, wherein the first direction is orthogonal to the second direction.

6. The laser UT apparatus of claim 1, wherein:
the first AOD comprises a first piezoelectric transducer coupled to a first crystal and is configured to generate first sound waves in the first direction; and
the second AOD is coupled to the first AOD and further comprises a second piezoelectric transducer coupled to a second crystal and is configured to generate second sound waves in the second direction.

7. The laser UT apparatus of claim 6, further comprising a plurality of AODs coupled to the second AOD, each of the plurality of AODs having a piezoelectric transducer configured to generate sound waves in a direction that is orthogonal to sound waves generated by an adjacent AOD of the plurality of AODs.

8. The laser UT apparatus of claim 6, wherein:
the third AOD comprises a third piezoelectric transducer coupled to a third crystal and is configured to generate third sound waves in the first direction; and
the fourth AOD is coupled to the third AOD and further comprises a fourth piezoelectric transducer coupled to a fourth crystal and is configured to generate fourth sound waves in the second direction.

9. The laser UT apparatus of claim 8, further comprising a plurality of AODs coupled to the fourth AOD, each of the plurality of AODs having a piezoelectric transducer configured to generate sound waves in a direction that is orthogonal to sound waves generated by an adjacent AOD of the plurality of AODs.

10. A system for non-destructively inspecting an object, the system comprising:
a robotic arm;
a controller configured to control movement of a tool center point (TCP) of the robotic arm; and
a laser ultrasonic testing (UT) apparatus coupled to the TCP, the laser UT apparatus comprising:
a first pair of acousto-optic deflectors (AODs), wherein each AOD of the first pair of AODs is configured to modulate position of an excitation laser beam generated by an excitation laser in one of an x-dimension or a y-dimension, wherein the x-dimension is orthogonal to the y-dimension; and
a second pair of AODs that are each configured to modulate position of a detection laser beam generated by a detection laser in one of the x-dimension or the y-dimension,
wherein the controller is further configured to control the first pair of AODs and the second pair of AODs to synchronize modulation of the position of the excitation laser beam and the detection laser beam along a path parallel with a first direction and to synchronize modulation of the position of the excitation laser beam and the detection laser beam along a path parallel with a second direction that is different than the first direction.

11. The system of claim 10, further comprising an interferometer detector configured to detect ultrasonic energy emitted from a surface of the object.

12. The system of claim 10, wherein the controller is further configured to synchronize excitation of the first pair of AODs with excitation of the second pair of AODs.

13. The system of claim 10, further comprising a surface profiler configured to determine a contour of a surface, generate contour information corresponding with the contour of the surface, and communicate the contour information to the controller.

14. The system of claim 10, wherein the controller is configured to determine contour information corresponding with a contour of a surface based on a computer-aided design model of the object.

15. The system of claim 10, wherein at least one of the first pair of AODs or the second pair of AODs comprises a piezoelectric transducer coupled to a crystal.

16. A method of non-destructively inspecting an object, the method comprising:
positioning a laser ultrasonic testing (UT) apparatus adjacent a surface of the object, wherein the laser UT apparatus comprises:

a first pair of acousto-optic deflectors (AODs) that are each configured to modulate deflection of an excitation laser beam in one of an x-dimension or a y-dimension, wherein the x-dimension is orthogonal to the y-dimension; and a second pair of AODs that are each configured to modulate deflection of a detection laser beam in one of the x-dimension or the y-dimension;

matching the deflection of the excitation laser beam with the deflection of the detection laser beam by synchronizing excitation of the first pair of AODs with excitation of the second pair of AODs;

scanning the object for defects; and traversing, with the laser UT apparatus at a predetermined distance from the surface, the surface of the object.

17. The method of claim 16, further comprising detecting, at an interferometer detector, ultrasonic energy emitted from the object.

18. The method of claim 17, further comprising analyzing the detected ultrasonic energy to identify existence of defects in the object.

19. The method of claim 16, wherein scanning the object for defects further comprises scanning the object according to contour information of the surface of the object.

20. The method of claim 16, further comprising maintaining, via a robotic arm, a predetermined distance between the laser UT apparatus and the object based on a contour of the surface.

* * * * *